US011926235B2

United States Patent
Zhou

(10) Patent No.: US 11,926,235 B2
(45) Date of Patent: Mar. 12, 2024

(54) CHARGE CONTROL DEVICE

(71) Applicant: DENSO CORPORATION, Kariya (JP)

(72) Inventor: Bo Zhou, Kariya (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 17/550,745

(22) Filed: Dec. 14, 2021

(65) Prior Publication Data

US 2022/0105824 A1 Apr. 7, 2022

Related U.S. Application Data

(63) Continuation of application No. PCT/JP2020/021030, filed on May 28, 2020.

(30) Foreign Application Priority Data

Jul. 12, 2019 (JP) .................................. 2019-130195

(51) Int. Cl.
*B60L 53/62* (2019.01)
*B60L 9/00* (2019.01)
*H02J 7/00* (2006.01)

(52) U.S. Cl.
CPC .................. *B60L 53/62* (2019.02); *B60L 9/00* (2013.01); *H02J 7/00712* (2020.01); *H02J 2207/20* (2020.01)

(58) Field of Classification Search
CPC .. B60L 53/62; B60L 9/00; B60L 1/003; B60L 53/20; B60L 58/10; H02J 7/00712; H02J 2207/20; H02J 2310/48; Y02T 90/12; Y02T 10/70; Y02T 10/7072; Y02T 90/14
USPC ............................................................ 307/31
See application file for complete search history.

(56) References Cited

U.S. PATENT DOCUMENTS

2014/0009165 A1* 1/2014 Miyazaki ........... G01R 31/3835
324/434

FOREIGN PATENT DOCUMENTS

JP 2010-119170 A 5/2010
JP 2019-006251 A 1/2019

OTHER PUBLICATIONS

Jul. 28, 2020 International Search Report issued in International Patent Application No. PCT/JP2020/021030.

* cited by examiner

*Primary Examiner* — Richard Tan
(74) *Attorney, Agent, or Firm* — Oliff PLC

(57) ABSTRACT

A charge control device includes a controller configured to control an in-vehicle charger. The in-vehicle charger is configured to convert external power supplied from an external power source into supply power to provide the supply power to a battery and an in-vehicle device which are attached to an electric vehicle.

8 Claims, 4 Drawing Sheets

CHARGE CONTROL DEVICE

CROSS REFERENCE TO RELATED APPLICATIONS

The present application is a continuation application of International Patent Application No. PCT/JP2020/021030 filed on May 28, 2020, which designated the U.S. and claims the benefit of priority from Japanese Patent Application No. 2019-130195 filed on Jul. 12, 2019. The entire disclosures of all of the above applications are incorporated herein by reference.

TECHNICAL FIELD

The present disclosure relates to a charge control device that controls a charge of a battery in an electric vehicle.

BACKGROUND

A charge control device that controls a charge of a battery mounted on an electric vehicle has been proposed.

SUMMARY

The present disclosure provides a chare control device. The charge control device includes a controller configured to control an in-vehicle charger. The in-vehicle charger is configured to convert external power supplied from an external power source into supply power to provide the supply power to a battery and an in-vehicle device which are attached to an electric vehicle.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
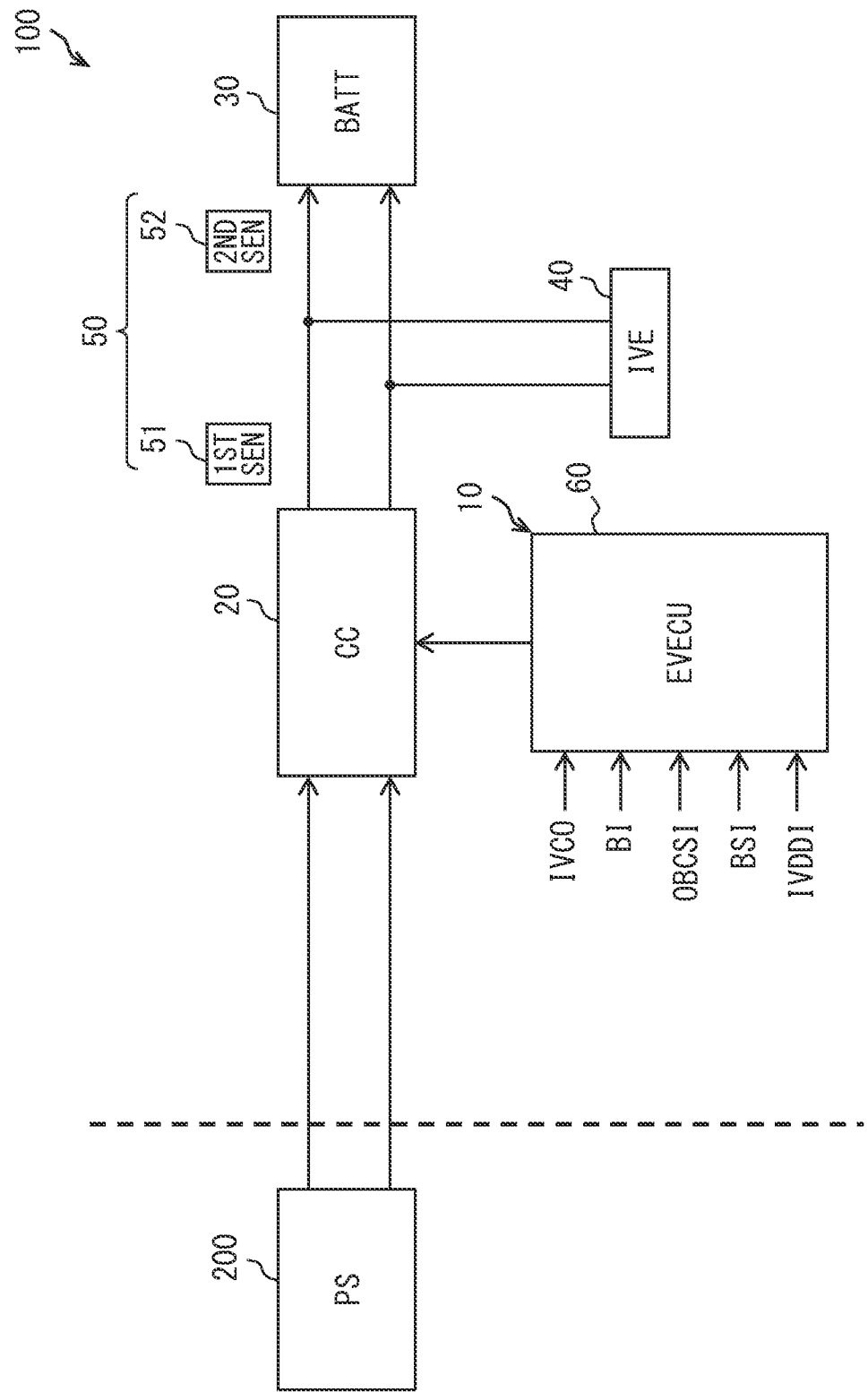
FIG. 1 is a block diagram showing a charge control system mounted on an electric vehicle.

For example, a charge control device charges a battery and drives an air conditioner when power is supplied from an external power source. This configuration may extend charging time of the battery.

The present disclosure provides a charge control device in which an extension of charging time for a battery is suppressed.

An exemplary embodiment of the present disclosure provides a charge control device. The charge control device includes a controller configured to control an in-vehicle charger. The in-vehicle charger is configured to convert external power supplied from an external power source into supply power to provide the supply power to a battery and an in-vehicle device which are attached to an electric vehicle. When there is a difference between the supply power and an input power input to the battery, the controller controls the in-vehicle charger to increase the supply power.

When the in-vehicle device is in the driving state, a part of the supplied power is input to the battery and the rest is input to the in-vehicle device. There is a difference between the supply power and the input power, and the input power supplied to the battery tends to decrease.

In the exemplary embodiment of the present disclosure, when there is a difference between the supply power and the input power, the amount of electric power of the supply power is increased. As a result, the decrease in the input power supplied to the battery is suppressed. The extension of the charging time of the battery is suppressed.

The following will describe embodiments for carrying out the present disclosure with reference to the drawings. In each embodiment, parts corresponding to the elements described in the preceding embodiments are denoted by the same reference numerals, and redundant explanation may be omitted. When only a part of a configuration is described in an embodiment, another preceding embodiment may be applied to the other parts of the configuration.

When, in each embodiment, it is specifically described that combination of parts is possible, the parts can be combined. In a case where any obstacle does not especially occur in combining the parts of the respective embodiments, it is possible to partially combine the embodiments, the embodiment and the modification, or the modifications even when it is not explicitly described that combination is possible.

First Embodiment

A charge control device 10 according to the present embodiment will be described with reference to FIGS. 1 to 4.

An electric vehicle is equipped with a charge control system 100 shown in FIG. 1. The charge control system 100 includes the charge control device 10. In addition to the charge control device 10, the charge control system 100 includes an in-vehicle charger 20, a battery 30, an in-vehicle device 40, a physical quantity sensor 50, and the like.

The charge control device 10 includes a controller 60. Specifically, the controller 60 is an EVECU. EV is an abbreviation of an Electric Vehicle. ECU is an abbreviation of an Electronic Controller. The controller 60 controls the drive of the in-vehicle charger 20 based on information input from the physical quantity sensor 50, other ECUs (not shown), and various sensors.

The in-vehicle charger 20 converts external power supplied from a power supply device 200 such as a stand located outside the electric vehicle into electric power based on a command signal input from the controller 60. As a result, the in-vehicle charger 20 generates supply power. The supply power generated by the in-vehicle charger 20 is supplied to the battery 30 and the in-vehicle device 40. The battery 30 is charged by the supply power. The in-vehicle device 40 is driven by the supply power.

In FIG. 1, the boundary between the electric vehicle and the outside thereof is shown by a broken line. The power supply device 200 is referred to as PS. The in-vehicle charger 20 is referred to as CC. The battery 30 is referred to as BATT. The in-vehicle device 40 is referred to as IVE. The power supply device 200 corresponds to an external power source.

The in-vehicle charger 20 includes a driver and a power conversion device. The power conversion device includes electronic elements such multiple switch elements and capacitors. The driver of the in-vehicle charger 20 performs pulse width modulation (PWM) control to the switch element based on a command signal input from the controller 60. The driver of the in-vehicle charger 20 adjusts the amount of electric power from transmitted from the external electric power by increasing or decreasing the on-duty ratio to generate the supply power.

Specifically, the battery 30 is a secondary battery such as a lithium ion storage battery. The battery 30 is charged by inputting the supply power larger than the output power of the battery 30. The output power of the battery 30 covers the required power of the in-vehicle device 40.

The in-vehicle device 40 is a power load of an air conditioner, a motor, or the like. When the power supply device 200 is connected to the electric vehicle, the electric vehicle is in a stopped state. At this time, an in-vehicle accessory such as an air conditioner that are driven by a low voltage can be switched between a driving state and a non-driving state.

When an in-vehicle accessory such as an air conditioner included in the in-vehicle device 40 is in the non-driving state, almost all of the supply power from the in-vehicle charger 20 is supplied to the battery 30 as the input power. Therefore, there is almost no difference between the supply power and the input power.

When an in-vehicle accessory such as an air conditioner included in the in-vehicle device 40 is in the driving state, the supply power from the in-vehicle charger 20 is supplied to the battery 30 and the in-vehicle device 40. Therefore, there is a difference between the supply power and the input power. The input power input to the battery 30 tends to decrease.

However, when both the supply of external power from the power supply device 200 and the driving state of the in-vehicle device 40 are established, the controller 60 controls the in-vehicle charger 20 such that the decrease in the input power is suppressed. This will be explained in detail later.

The physical quantity sensor 50 detects the physical quantity related to the supply power output from the in-vehicle charger 20 and the input power input to the battery 30. Specifically, the physical quantity sensor 50 detects a current as the physical quantity. Therefore, the physical quantity sensor 50 includes a first current sensor 51 (1ST SEN) that detects the supply current output from the in-vehicle charger 20, and a second current sensor 52 (2ND SEN) that detects the input current input to the battery 30. The outputs of the first current sensor 51 and the second current sensor 52 are input to the controller 60.

Various information shown in FIG. 1 is input to the controller 60 from the physical quantity sensor 50, other in-vehicle sensors, and various ECUs. That is, the supply current output from the in-vehicle charger 20 and the input current input to the battery 30 are input to the controller 60 from the physical quantity sensor 50. The state information of the in-vehicle charger 20, the state information of the battery 30, and the drive information of the in-vehicle device 40 are input to the controller 60 from the in-vehicle sensor and various ECUs. The controller 60 generates a command signal for controlling the drive of the in-vehicle charger 20 based on the input information.

In FIG. 1, the supply current output from the in-vehicle charger 20 is referred to as IVCO. The input current input to the battery 30 is referred to as BI. The state information of the in-vehicle charger 20 is referred to as OBCSI. The state information of the battery 30 is referred to as BSI. The drive information of the in-vehicle device 40 is referred to as IVDDI.

The command signal includes an on-duty ratio of PWM control of the multiple switches constituting the power conversion circuit of the in-vehicle charger 20. The controller 60 increases the on-duty ratio included in the command signal as the power consumption of the in-vehicle device 40 increases. The controller 60 performs a process (supply power correction process) for suppressing a decrease in the amount of input power supplied from the in-vehicle charger 20 to the battery 30 depending on the driving state of the in-vehicle device 40.

(Power Supply Correction Process)

Figure 3:
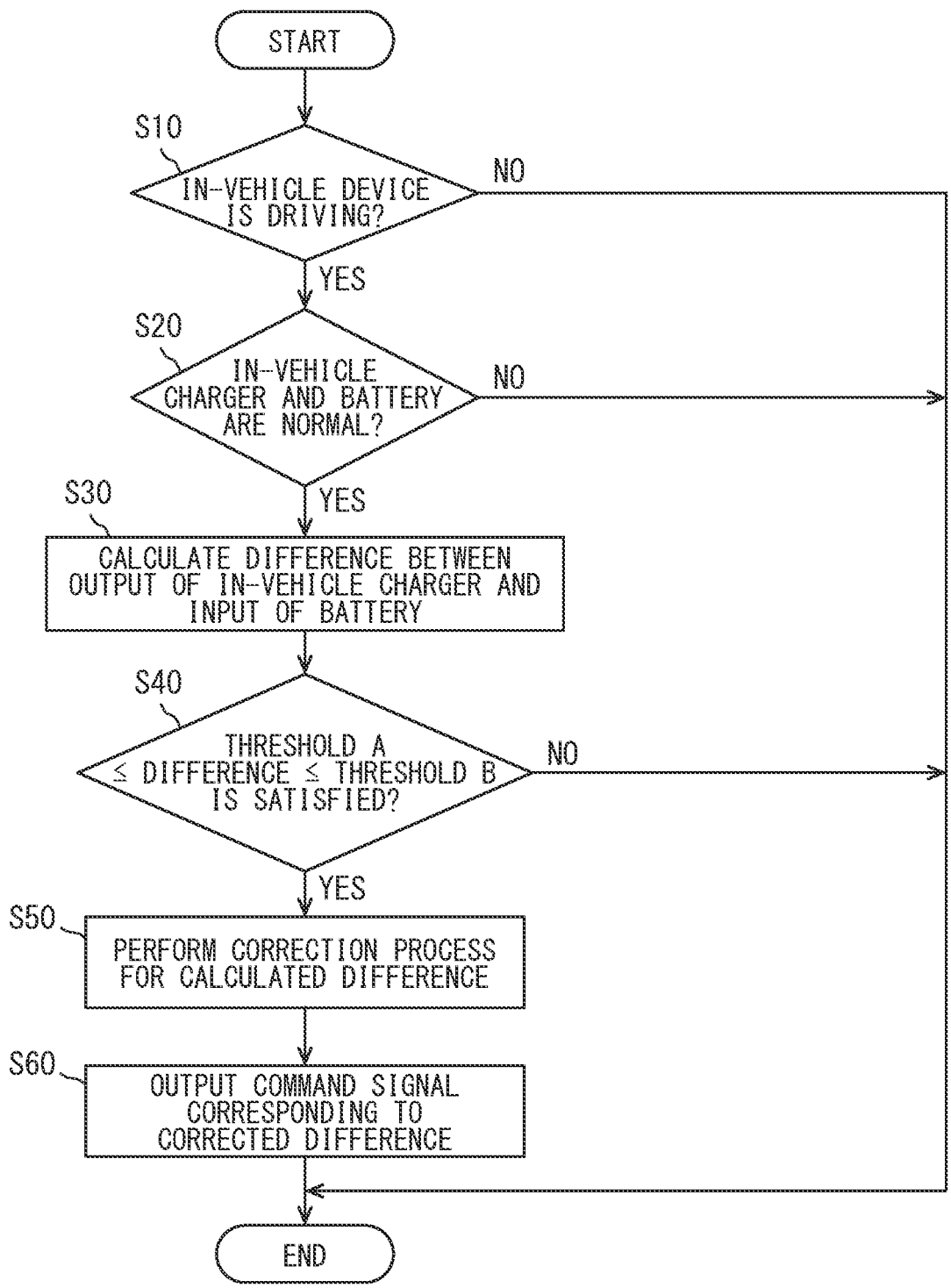
FIG. 3 is a flowchart showing a power supply correction process.
Figure 4:
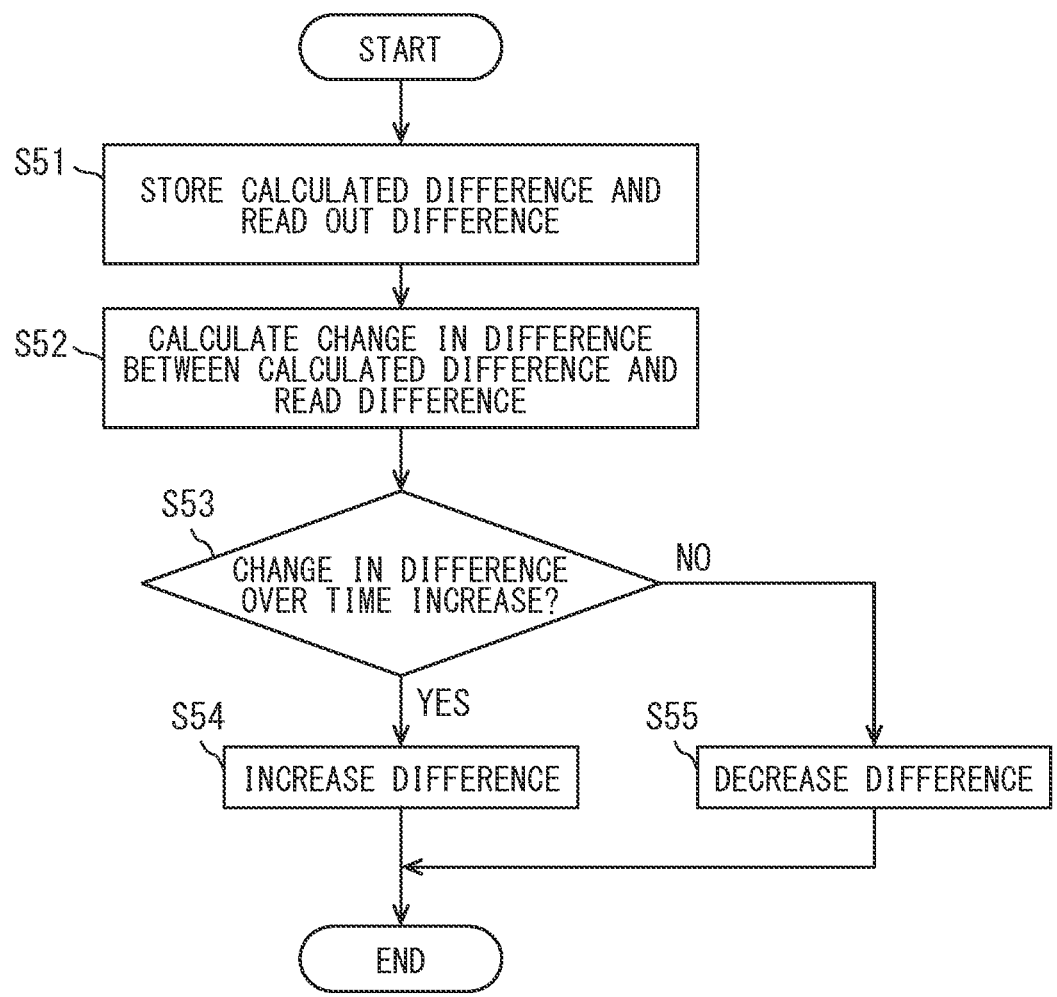
FIG. 4 is a flowchart showing a difference correction process.

Next, the supply power correction process performed by the controller 60 will be described with reference to FIGS. 2 to 4. When the power supply device 200 is connected to the electric vehicle, the controller 60 repeatedly performs this supply power correction process at a predetermined cycle.

However, the controller 60 performs this supply power correction process when the SOC of the battery 30 is equal to or less than a predetermined value. This predetermined value is, for example, about 90% of the full charge. The controller 60 performs the supply power correction process when the SOC of the battery 30 is lower than the vicinity of full charge. A value other than 90% of the full charge of the battery 30 may be adopted as the predetermined value.

Figure 2:
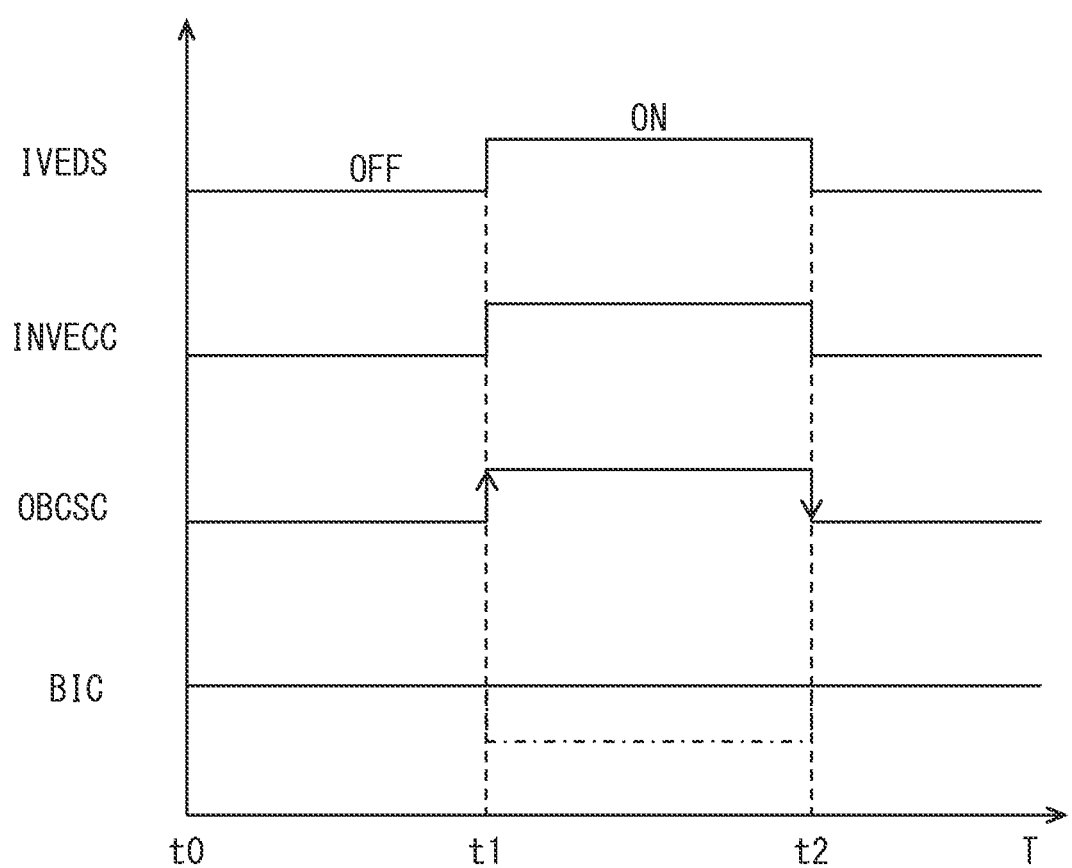
FIG. 2 is a timing chart showing a change over time of a current when an external power is supplied.

First, the power supply correction process will be outlined based on FIG. 2. FIG. 2 shows the driving state of the in-vehicle device 40 and the time change of the current flowing through the electric vehicle when the external power is supplied from the power supply device 200 to the charge control system 100. The in-vehicle device drive state is described as IVEDS. The current consumption of in-vehicle device is referred to as INVECC. The in-vehicle charger supply current is referred to as OBCSC. The battery input current is referred to as BIC. The time is referred to as T.

At the time t0 in FIG. 2, the in-vehicle device 40 is in the non-driving state. Therefore, the current consumption of the in-vehicle device 40 is zero. The supply current of the in-vehicle charger 20 and the input current of the battery 30 are equivalent.

When the time elapses from the time t0 to the time t1, the in-vehicle device 40 changes from the non-driving state to the driving state. The current consumption of the in-vehicle device 40 increases from zero. The supply current of the in-vehicle charger 20 is input not only to the battery 30 but also to the in-vehicle device 40. Therefore, the supply current of the in-vehicle charger 20 and the input current of the battery 30 change to be different with each other.

The controller 60 calculates a difference current $\Delta I$ between the supply current I1 of the in-vehicle charger 20 detected by the first current sensor 51 and the input current I2 of the battery 30 detected by the second current sensor 52. The controller 60 stores a first threshold value IA based on a measurement error of the first current sensor 51 and the second current sensor 52. Further, the controller 60 stores a second threshold value IB based on a maximum current consumption (maximum power consumption) of the in-vehicle device 40. The first threshold value corresponds to a lower threshold value. The second threshold value corresponds to an upper threshold value.

The controller 60 determines that it is necessary to correct the supply power when the differential current $\Delta I$ is equal to or greater than the first threshold value IA and equal to or less than the second threshold value IB. At the time t1 shown in FIG. 2, the controller 60 determines that this correction condition is satisfied. Then, the controller 60 increases the on-duty ratio included in the command signal. The amount of increase in the on-duty ratio increases as the differential current ΔI increases. The controller 60 outputs the command signal including this on-duty ratio to the in-vehicle charger 20.

As a result, the supply current (supply power) of the in0vehicle charger 20 increases as shown by the solid arrow. As shown by the dash-dot line, the decrease in the input current input to the battery 30 is suppressed. The decrease in the input power input to the battery 30 is suppressed.

When the time elapses from the time t1 to the time t2, the in-vehicle device 40 changes from the driving state to the non-driving state. Therefore, the current consumption of the in-vehicle device 40 is reduced to zero. The supply current of the in-vehicle charger 20 and the input current of the battery 30 are equivalent.

The controller 60 determines that the differential current ΔI is less than the first threshold value IA or greater than the second threshold value IB at the time t2 shown in FIG. 2. At this time, the controller 60 determines the on-duty ratio independently of ΔI. Then, the controller 60 reduces the on-duty ratio included in the command signal. The controller 60 outputs the command signal including this on-duty ratio to the in-vehicle charger 20. The on-duty ratio at this time is, for example, 50%.

As a result, the supply current (supply power) of the in0vehicle charger 20 decreases as shown by the solid arrow. As a result, the change in the input current input to the battery 30 is suppressed.

Next, the power supply correction process will be described in detail with reference to FIGS. 3 and 4. The start is indicated by S and the end is indicated by E. As described above, this supply power correction process is performed when the SOC of the battery 30 is lower than the vicinity of full charge.

In S10, the controller 60 determines whether the in-vehicle device 40 is in the driving state based on the driving information of the in-vehicle device 40. When the in-vehicle device 40 is in the driving state, the controller 60 proceeds to S20. When the in-vehicle device 40 is in the non-driving state, the controller 60 terminates the supply power correction process.

When the process proceeds to S20, the controller 60 determines whether each of the in-vehicle charger 20 and the battery 30 is in the normal state based on the state information of the in-vehicle charger 20 and the battery 30. When each of the in-vehicle charger 20 and the battery 30 is in the normal state, the controller 60 proceeds to S30. When at least one of the in-vehicle charger 20 and the battery 30 is in an abnormal state, the controller 60 terminates the supply power correction process.

When the process proceeds to S30, the controller 60 acquires the supply current I1 of the in-vehicle charger 20 and the input current I2 of the battery 30 from the first current sensor 51 and the second current sensor 52. The controller 60 calculates the differential current ΔI by differentiating the supply current I1 and the input current I2. After this, the controller 60 proceeds to S40. In FIG. 3, the supply current I1 is described as the in-vehicle charger output. The input current I2 is described as a battery input. The difference current ΔI is described as a difference.

When the process proceeds to S40, the controller 60 determines whether the differential current ΔI is equal to or greater than the first threshold value IA and is equal to or less than the second threshold value IB. When the difference current ΔI is equal to or greater than the first threshold value IA and equal to or less than the second threshold value IB, the controller 60 proceeds to S50. When the difference current ΔI is less than the first threshold value IA or greater than the second threshold value IB, the controller 60 terminates the supply power correction process. In FIG. 3, the first threshold value IA is described as a threshold value A. The second threshold IB is described as a threshold B.

When the process proceeds to S50, the controller 60 performs a difference correction process on the difference current ΔI based on the change over time of the difference current ΔI. After this, the controller 60 proceeds to S60. This difference correction process will be described in detail later with reference to FIG. 4.

When the process proceeds to S60, the controller 60 generates a command signal including an on-duty ratio corresponding to the corrected difference current ΔI. Then, the controller 60 outputs the command signal to the in-vehicle charger 20. When this process is performed, the controller 60 terminates the supply power correction process.

(Difference Correction Process)

Next, the difference correction process will be described with reference to FIG. 4. In S50 of the power supply correction process shown in FIG. 3, the controller 60 performs the process shown below. Also in FIG. 4, the difference current ΔI is described as the difference.

In S51, the controller 60 stores the difference current ΔI calculated in S30 in a memory of the charge control device 10. Then, the controller 60 reads out the difference current ΔI stored in the previously performed supply power correction process from the memory. After this, the controller 60 proceeds to S52.

When the supply power correction process is performed for the first time, the differential current ΔI is not stored in the memory. Therefore, in this case, the controller 60 does not perform the difference correction process in S50. Alternatively, an initial value of the differential current ΔI may be stored in advance in the memory. In this case, the controller 60 reads out the initial value stored in advance in the memory in S51 when the supply power correction process is performed for the first time. After this, the controller 60 proceeds to S52.

When the process proceeds to S52, the controller 60 calculates the change over time of the difference current ΔI based on the calculated difference current ΔI and the read difference current ΔI. After this, the controller 60 proceeds to S53.

When the process proceeds to S53, the controller 60 determines whether the change over time of the differential current ΔI is increased or decreased. When the change over time of the difference current ΔI is increased, the controller 60 proceeds to S54. When the change over time of the difference current ΔI is decreased, the controller 60 proceeds to S55.

When the process proceeds to S54, the controller 60 determines that the current consumption of the in-vehicle device 40 tends to increase. Then, the controller 60 corrects the difference current ΔI calculated in S30 to be increased. For example, the controller 60 corrects the difference current ΔI by multiplying the difference current ΔI by a coefficient greater than 1. The value of this coefficient may increase according to the amount of the increasing tendency of the current consumption, or may be a constant value regardless of the amount of the increasing tendency.

When the process proceeds to S55, the controller 60 determines that the current consumption of the in-vehicle device 40 tends to decrease. Then, the controller 60 corrects the difference current ΔI calculated in S30 to be decreased. For example, the controller 60 corrects the difference current ΔI by multiplying the difference current ΔI by a coefficient smaller than 1. The value of this coefficient may decrease according to the amount of the decreasing tendency of the current consumption, or may be a constant value regardless of the amount of the decreasing tendency.

When S54 or step S55 is executed, the controller 60 terminates the supply power correction process.

(Operational Effects)

Next, the operation and effect of the charge control device 10 including the controller 60 will be described.

The controller 60 controls the drive of the in-vehicle charger 20 such that the amount of electric power input to the battery 30 increases when there is a difference between the supply current and the input current. As a result, the decrease in the input power supplied to the battery 30 is suppressed. The extension of the charging time of the battery 30 is suppressed.

The controller 60 increases the power supply output from the in-vehicle charger 20 when the differential current ΔI is equal to or greater than the first threshold value IA based on the measurement error of the current sensor. With this configuration, it is possible to suppress an increase in the power supply even though the in-vehicle device 40 is not driven. Hunting for increasing correction for the power supply is suppressed.

The controller 60 increases the supply power output from the in-vehicle charger 20 when the differential current ΔI is equal to or less than the second threshold value IB based on the maximum current consumption (maximum power consumption) of the in-vehicle device 40. With this configuration, since the supply power supplied to the in-vehicle device 40 exceeds the maximum power consumption, it is possible to suppress an increase in the supply power even though the excess power is input to the battery 30.

A delay due to arithmetic processing occurs between the time when the physical quantity sensor 50 detects the supply current I1 and the input current I2 and the time when the controller 60 generates the command signal. Due to this delay, the supply current I1 and the input current I2 when the drive of the in-vehicle charger 20 is controlled by the command signal output from the controller 60 differ from the supply current I1 and the input current I2 detected by the physical quantity sensor 50.

Therefore, the controller 60 corrects the difference current ΔI to be increased when the change over time of the differential current ΔI is increasing. The controller 60 corrects the difference current ΔI to be decreased when the change over time of the differential current ΔI is decreasing.

The configuration can suppress generation of a large difference between the corrected differential current used by the controller 60 to calculate the command signal and the difference current between the supply current and the input current when the drive of the in-vehicle charger 20 is controlled by this command signal. It is suppressed that the correction process of the supply power becomes inappropriate.

The controller 60 according to the present embodiment may be provided by (a) logic called if-then-else formats or (b) learned models tuned by machine learning. The learned model tuned by machine learning is provided by an algorithm as a neural network, for example.

The controller 60 is provided by a control system including at least one computer. The control system may include multiple computers linked by a data communication device. The computer includes at least one processor (hardware processor) that is hardware. The hardware processor can be provided by the following (i), (ii), or (iii).

(i) The hardware processor may be at least one processor core that executes a program stored in at least one memory. In this case, the computer is provided with at least one memory and at least one processor core. The processor core is called a CPU, GPU, RISC-CPU, or the like. The CPU is an abbreviation for Central Processing Unit. The GPU is an abbreviation for Graphics Processing Unit. The memory is also referred to as a storage medium. The memory is a non-transitory and tangible storage medium non-temporarily storing "at least one a program and data" readable by a processor. The storage medium may be a semiconductor memory, a magnetic disk, an optical disk, or the like. The program may be distributed as a single unit or as a storage medium in which the program is stored.

(ii) The hardware processor may be a hardware logic circuit. In this case, the computer is provided by a digital circuit including a number of programmed logic units (gate circuits). The Digital circuit may be also referred to as a logic circuit array such as ASIC, FPGA, PGA, CPLD or the like. ASIC stands for Application Specific Integrated Circuit. The FPGA is an abbreviation for Field Programmable Gate Array. The PGA is an abbreviation for Programmable Gate Array. The CPLD is an abbreviation for Complex Programmable Logic Device. The digital circuit may comprise a memory for storing programs and/or data. The computer may be provided by an analog circuit. A computer may be provided by a combination of a digital circuit and an analog circuit.

(iii) The hardware processor may be a combination of the above (i) and the above (ii). (i) and (ii) are disposed on different chips or on a common chip. In these cases, the part (ii) is also called an accelerator.

The controller 60, the signal source, and the control object provide various elements. At least some of these elements may be referred to as a block, a module, or a section.

The controller 60 and a method thereof described in this disclosure may be realized by a dedicated computer provided by configuring a processor and a memory programmed to execute one or multiple functions embodied by a computer program. Alternatively, the controller 60 and the method thereof described in this disclosure may be realized by a dedicated computer provided by configuring a processor with one or more dedicated hardware logic circuits. Alternatively, the controller 60 and the method thereof described in this disclosure may be realized by one or more dedicated computers configured by a combination of a processor and a memory programmed to execute one or multiple functions, and a processor configured by one or more hardware logic circuits. The computer program may be stored, as instructions to be executed by a computer, in a tangible non-transitory computer-readable medium.

While preferred embodiments of the present disclosure have been described above, the present disclosure is not limited in any way by the embodiments described above, and may be carried out with various modifications without departing from the scope of the subject matter of the present disclosure.

(Modification)

In the above embodiment, an example is shown in which the physical quantity sensor 50 detects a current as a physical quantity related to the supply power and the input power. However, the physical quantity detected by the physical quantity sensor 50 is not limited to the current, and for example, a voltage may be detected.

Although the present disclosure has been described in accordance with the examples, it is understood that the present disclosure is not limited to such examples or structures. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A charge control device comprising:
a controller configured to control an in-vehicle charger, the in-vehicle charger being configured to convert external power supplied from an external power source into supply power to provide the supply power to a battery and an in-vehicle device which are attached to an electric vehicle, wherein:
when there is a difference between the supply power and an input power input to the battery, the controller controls the in-vehicle charger to increase the supply power;
the controller determines whether there is the difference between the supply power and the input power based on an input of a physical quantity sensor that detects physical quantities depending on the supply power and the input power; and
when the difference between the supply power and the input power is equal to or greater than a lower limit threshold related to a measurement error of the physical quantity sensor, the controller controls the in-vehicle charger to increase the supply power.

2. The charge control device according to claim 1, wherein
when the difference between the supply power and the input power is equal to or less than an upper limit threshold related to a maximum power consumption of the in-vehicle device, the controller controls the in-vehicle charger to increase the supply power.

3. The charge control device according to claim 1, wherein
when a change over time of the difference between the supply power and the input power increases, the controller controls the in-vehicle charger to increase the supply power such that an increased amount of the supply power is corrected to be increased, and
when the change over time of the difference between the supply power and the input power decreases, the controller controls the in-vehicle charger to increase the supply power such that the increased amount of the supply power is corrected to be decreased.

4. The charge control device according to claim 1, further comprising
an input device configured to input the input power.

5. The charge control device according to claim 1, further comprising
a memory configured to store the difference that has been detected.

6. A charge control device comprising:
a processor configured to control an in-vehicle charger, the in-vehicle charger being configured to convert external power supplied from an external power source into supply power to provide the supply power to a battery and an in-vehicle device which are attached to an electric vehicle, wherein:
when there is a difference between the supply power and an input power input to the battery, the processor controls the in-vehicle charger to increase the supply power;
the processor determines whether there is the difference between the supply power and the input power based on an input of a physical quantity sensor that detects physical quantities depending on the supply power and the input power; and
when the difference between the supply power and the input power is equal to or greater than a lower limit threshold related to a measurement error of the physical quantity sensor, the processor controls the in-vehicle charger to increase the supply power.

7. The charge control device according to claim 6, wherein
when the difference between the supply power and the input power is equal to or less than an upper limit threshold related to a maximum power consumption of the in-vehicle device, the processor controls the in-vehicle charger to increase the supply power.

8. A charge control device comprising:
a controller configured to control an in-vehicle charger, the in-vehicle charger being configured to convert external power supplied from an external power source into supply power to provide the supply power to a battery and an in-vehicle device which are attached to an electric vehicle, wherein:
when there is a difference between the supply power and an input power input to the battery, the controller controls the in-vehicle charger to increase the supply power; and
when the difference between the supply power and the input power is equal to or less than an upper limit threshold related to a maximum power consumption of the in-vehicle device, the controller controls the in-vehicle charger to increase the supply power.

* * * * *